United States Patent
Clements et al.

(10) Patent No.: US 11,105,200 B2
(45) Date of Patent: Aug. 31, 2021

(54) COUNTER ROTATING POWER TURBINE WITH REDUCTION GEARBOX

(71) Applicant: General Electric Company, Schenectady, NY (US)

(72) Inventors: Jeffrey Donald Clements, Mason, OH (US); Darek Tomasz Zatorski, Fort Wright, KY (US); Brandon Wayne Miller, Liberty Township, OH (US); Joseph Robert Dickman, Monroe, OH (US)

(73) Assignee: General Electric Company, Schenectady, NY (US)

( * ) Notice: Subject to any disclaimer, the term of this patent is extended or adjusted under 35 U.S.C. 154(b) by 146 days.

(21) Appl. No.: 15/648,867

(22) Filed: Jul. 13, 2017

(65) Prior Publication Data

US 2019/0017382 A1  Jan. 17, 2019

(51) Int. Cl.
*F01D 1/26* (2006.01)
*F01D 5/06* (2006.01)
(Continued)

(52) U.S. Cl.
CPC .............. *F01D 1/26* (2013.01); *F01D 5/03* (2013.01); *F01D 5/06* (2013.01); *F01D 15/12* (2013.01);
(Continued)

(58) Field of Classification Search
CPC ...... F01D 1/26; F01D 5/03; F02C 3/10; F02C 3/107; F02C 7/36
See application file for complete search history.

(56) References Cited

U.S. PATENT DOCUMENTS 3,703,076 A * 11/1972 Hagemeister ......... F01D 21/006
60/39.163
4,282,709 A    8/1981 Kronogard
(Continued)

FOREIGN PATENT DOCUMENTS

| GB | 1204321 A | 9/1970 |
| JP | 2012/512987 A | 6/2012 |
| JP | 2013/531579 A | 8/2013 |

OTHER PUBLICATIONS

Extended European Search Report and Opinion issued in connection with corresponding EP Application No. 18182064.8 dated Nov. 12, 2018.
(Continued)

*Primary Examiner* — Woody A Lee, Jr.
*Assistant Examiner* — Brian O Peters
(74) *Attorney, Agent, or Firm* — Dority & Manning, P.A.

(57) ABSTRACT

The present disclosure is directed to a turbine engine defining a longitudinal direction, a radial direction, and a circumferential direction. The turbine engine includes a power turbine including a first turbine rotor assembly interdigitated with a second turbine rotor assembly along the longitudinal direction; a gear assembly coupled to the first turbine rotor assembly and the second turbine rotor assembly, wherein the gear assembly includes a first input interface coupled to the first turbine rotor assembly, a second input interface coupled to the second turbine rotor assembly, and one or more third gears coupled to the first input interface and the second input interface therebetween; and a first output shaft and a second output shaft, wherein each of the first output shaft and the second output shaft are configured to couple to an electrical load device.

24 Claims, 1 Drawing Sheet

(51) Int. Cl.
  *F01D 15/12*    (2006.01)
  *F01D 25/28*    (2006.01)
  *F01D 5/03*     (2006.01)
  *F02C 7/36*     (2006.01)
  *F02C 3/10*     (2006.01)
  *F02C 3/107*    (2006.01)

(52) U.S. Cl.
  CPC ............... *F01D 25/28* (2013.01); *F02C 3/10* (2013.01); *F02C 3/107* (2013.01); *F02C 7/36* (2013.01); *F05D 2220/30* (2013.01); *F05D 2240/60* (2013.01); *F05D 2260/40311* (2013.01)

(56) References Cited

U.S. PATENT DOCUMENTS

| | | | |
|---|---|---|---|
| 4,936,748 A * | 6/1990 | Adamson | F02C 6/206 416/123 |
| 7,451,592 B2 | 11/2008 | Taylor et al. | |
| 7,490,460 B2 | 2/2009 | Moniz et al. | |
| 7,716,914 B2 | 5/2010 | Schilling | |
| 7,726,113 B2 | 6/2010 | Orlando et al. | |
| 7,882,693 B2 | 2/2011 | Schilling | |
| 7,937,927 B2 | 5/2011 | Suciu et al. | |
| 8,015,798 B2 | 9/2011 | Norris et al. | |
| 8,402,740 B2 | 3/2013 | Guemmer | |
| 8,807,916 B2 | 8/2014 | Sheridan et al. | |
| 8,876,462 B2 | 11/2014 | Balk et al. | |
| 9,011,076 B2 | 4/2015 | Suciu et al. | |
| 9,194,290 B2 | 11/2015 | Suciu et al. | |
| 9,239,004 B2 | 1/2016 | Kupratis et al. | |
| 9,458,729 B2 | 10/2016 | De Wergifosse et al. | |
| 9,611,788 B2 * | 4/2017 | Sidelkovskiy | F01D 15/10 |
| 2012/0177493 A1 | 7/2012 | Fabre | |

OTHER PUBLICATIONS

Machine Translated Japanese Office Action Corresponding to Application No. 2018132039 dated Sep. 24, 2019.

* cited by examiner

COUNTER ROTATING POWER TURBINE WITH REDUCTION GEARBOX

FIELD

The present subject matter relates generally to turbine engine architecture. More particularly, the present subject matter relates to reduction gearbox and turbine section arrangement for turbine engines.

BACKGROUND

Electrical grids generally operate in either a 50 Hz or 60 Hz frequency. In certain instances, a single nation may operate in both frequencies (e.g., Japan). Therefore, turbine engines for power generation are designed to accommodate the different frequencies. In one instance, turbine engines are designed with separate power turbines for each frequency. As such, a gas generator core is paired with a power turbine that will output the desired frequency in order to maintain a desired efficiency and performance. However, in such instances, achieving similarly desired efficiency and performance at another frequency output requires another power turbine or the addition of a gearbox to reduce or increase the output frequency accordingly.

In other instances, the turbine engine may operate with a single combination of gas generator and power turbine. However, turbine engines are generally designed to a design point at which a maximum efficiency and performance is obtained. Therefore, operation away from the design point yields a reduced efficiency and performance. As such, operating a turbine engine configured for 60 Hz operation at a 50 Hz output (or vice versa) yields a reduced efficiency and performance.

Therefore, a need exists for a turbine engine that outputs two frequencies while maintaining or improving efficiency and performance at both frequencies.

BRIEF DESCRIPTION

Aspects and advantages of the invention will be set forth in part in the following description, or may be obvious from the description, or may be learned through practice of the invention.

The present disclosure is directed to a turbine engine defining a longitudinal direction, a radial direction, and a circumferential direction. The turbine engine includes a power turbine including a first turbine rotor assembly interdigitated with a second turbine rotor assembly along the longitudinal direction; a gear assembly coupled to the first turbine rotor assembly and the second turbine rotor assembly, in which the gear assembly includes a first input interface coupled to the first turbine rotor assembly, a second input interface coupled to the second turbine rotor assembly, and one or more third gears coupled to the first input interface and the second input interface therebetween; and a first output shaft and a second output shaft, in which each of the first output shaft and the second output shaft are configured to couple to an electrical load device.

In one embodiment, the gear assembly further includes an output interface, in which the first output shaft is coupled to the output interface of the gear assembly.

In another embodiment, the second turbine rotor assembly is coupled to the second input interface via the second output shaft.

In various embodiments, the turbine engine further includes a turbine frame defining a static support structure onto which the gear assembly is at least partially disposed. In one embodiment, the third gear is coupled to the static support structure of the turbine frame. In another embodiment, the third gear is further coupled to an output interface, in which the third gear provides a motive force from the first input interface, and the first turbine rotor assembly rotates in the circumferential direction at a rotational speed approximately equal to the first output shaft.

In still various embodiments, the gear assembly defines a gear ratio of 5:6 of the first input interface coupled to the first turbine rotor assembly relative to the second input interface coupled to the second turbine rotor assembly. In one embodiment, the first turbine rotor assembly is configured to rotate at a steady state speed of approximately 3000 revolutions per minute and the second turbine rotor assembly is configured to rotate at a steady state speed of approximately 3600 revolutions per minute.

In various embodiments, the gear assembly further comprises a carrier. In one embodiment, the third gear defines a planet gear coupled to first turbine rotor assembly at the first input interface and coupled to the second turbine rotor assembly at the second input interface, and the carrier is coupled to the third gear. In one embodiment, the first output shaft is coupled to the carrier and the second output shaft is coupled to an output interface at the third gear. In another embodiment, the gear assembly defines a gear ratio of 5:6 of the carrier coupled to the first output shaft versus the output interface coupled to the second output shaft. In still another embodiment, the first turbine rotor assembly and the second turbine rotor assembly are configured to rotate at approximately at a speed greater than 3600 RPM.

In one embodiment, the first turbine rotor assembly is configured to rotate in a first circumferential direction and the second turbine rotor assembly is configured to rotate in a second circumferential direction opposite of the first circumferential direction.

In another embodiment, the turbine engine further includes an output shaft assembly including a locking mechanism configured to alternatively couple the first output shaft and the second output shaft.

In various embodiments, the first turbine rotor assembly of the power turbine includes an outer rotor comprising a plurality of outer rotor airfoils extended inward along the radial direction. The first turbine rotor assembly further includes one or more rotating frames coupling the outer rotor to the gear assembly. In one embodiment, the second turbine rotor assembly of the power turbine includes an inner rotor comprising a plurality of inner rotor airfoils extended outward along the radial direction and in alternating arrangement along the longitudinal direction with the plurality of outer rotor airfoils of the first turbine rotor assembly. In another embodiment, the inner rotor is coupled to the second output shaft coupled to the gear assembly.

In still various embodiments, the one or more rotating frames of the first turbine rotor assembly is further coupled to the first output shaft.

In one embodiment, the turbine engine further includes one or more bearing assemblies disposed between one or more of the first output shaft and a turbine frame, between the first turbine rotor assembly and the second turbine rotor assembly, and between the turbine frame and one or more of the first turbine rotor assembly and the second turbine rotor assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
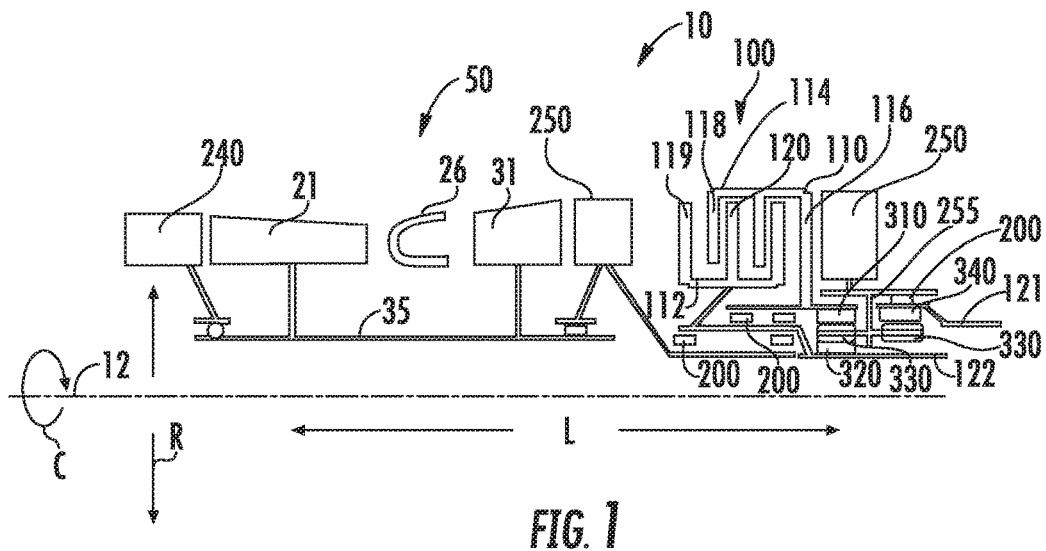
FIG. 1 is a schematic cross sectional view of an exemplary turbine engine incorporating an exemplary embodiment of a power turbine according to an aspect of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows. Unless otherwise stated, "downstream" and "upstream" refer to the general direction of fluid flow of air or resulting combustion gases through a core flowpath of the engine from entry in the compressor section through exit from a turbine section.

Embodiments of a turbine engine including a counter-rotating power turbine with gear assembly that may output two frequencies while maintaining or improving efficiency and performance at both frequencies is generally provided. The embodiments of the turbine engine provided herein improve efficiency and performance of power generating turbine engines while enabling dual frequency output (e.g., 50 Hz and 60 Hz) from a single power turbine and gear assembly. The embodiments provided herein enable design and operation of the turbine engine at a desired design point, thus maximizing efficiency and performance, while further outputting dual frequencies from the power turbine. As such, the turbine engine enables efficient operation at both frequencies while avoiding off-design point operation that reduces efficiency and performance. Furthermore, the interdigitated power turbine reduces airfoil count, weight, and length, overall improving performance of the turbine engine.

Figure 2:
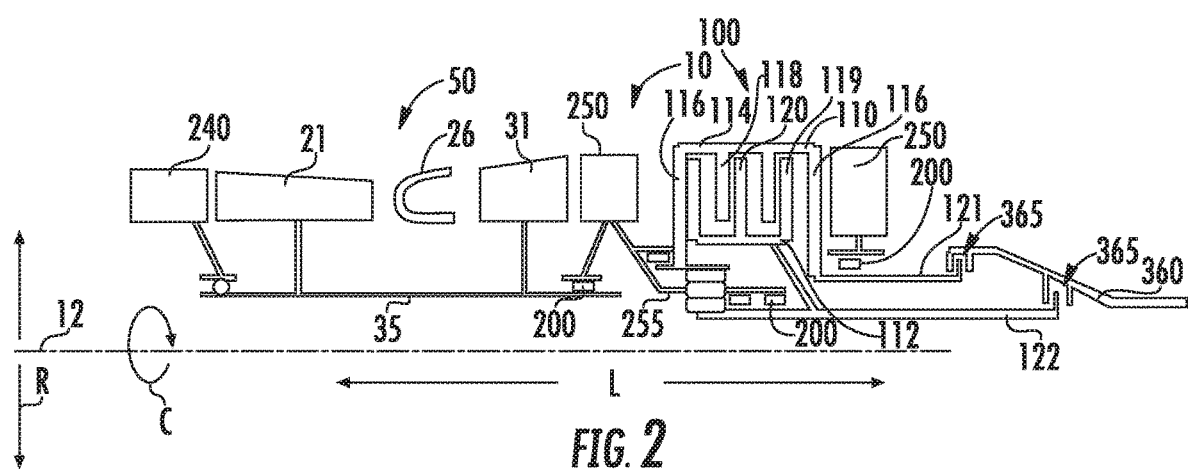
FIG. 2 is a schematic cross sectional view of an exemplary turbine engine incorporating another exemplary embodiment of a power turbine according to an aspect of the present disclosure.
Figure 3:
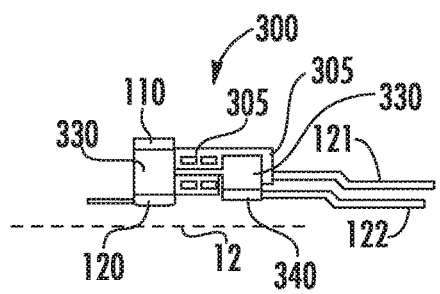
FIG. 3 is a schematic cross sectional view of a portion of an exemplary turbine engine incorporating another exemplary embodiment of a power turbine according to an aspect of the present disclosure.

Referring now to the figures, schematic cross sectional views of exemplary embodiments of a turbine engine 10 including a gas generator 50, a power turbine 100, and a gear assembly 300 are generally provided in FIGS. 1-3. The engine 10 defines a longitudinal direction L, a radial direction R, and a circumferential direction C around an axial centerline 12 extended along the longitudinal direction L and depicted for reference purposes. The engine 10 depicted in FIGS. 1-3 generally defines a power generating turbine engine, such as, but not limited to, industrial or marine turbine engines, including gas and steam turbines.

The engine 10 includes the gas generator 50, which defines in serial flow arrangement, a compressor section 21, a combustion section 26, a turbine section 31, and the power turbine 100. The compressor section 21 and the turbine section 31 are coupled together and rotatable via a driveshaft 35 extended along the longitudinal direction L. A compressor frame 240 including one or more bearing assemblies 200 is disposed upstream of or within the compressor section 21. A turbine frame 250 including one or more bearing assemblies 200 is disposed downstream of or within the turbine section 31. The driveshaft 35, coupling together rotary members of the compressor section 21 and the turbine section 31, is supported by the bearing assemblies 200 within the compressor frame 240 and the turbine frame 250.

Although not depicted in further detail, it should be appreciated that the compressor section 21 may include one or more compressors (e.g., a low pressure compressor, an intermediate pressure compressor, a high pressure compressor) further including pluralities of rotating blades and generally stationary vanes. The compressor section 21 may further include various fluid services for lubrication of the bearings or fluid bleeds for controlling engine performance or supplying other portions of the engine 10 and subsystems. Furthermore, although not depicted in further detail, it should be appreciated that the turbine section 21 may include one or more turbines further including pluralities of rotating blades and generally stationary vanes, bleeds, cooling, lube supplies, etc.

Referring now to FIGS. 1-2, the power turbine 100 includes a first turbine rotor assembly 110 interdigitated with a second turbine rotor assembly 120 along the longitudinal direction L. The first turbine rotor assembly 110 includes an outer rotor 114. The outer rotor 114 includes a plurality of outer rotor airfoils 118 extended inward along the radial direction R. The first turbine rotor assembly 110 further includes one or more rotating frames 116 coupling the outer rotor 114 to the gear assembly 300.

The rotating frame 116 defines a plurality of airfoils arranged along the circumferential direction C. Furthermore, the rotating frame 116 defines a structural support enabling the overhung or cantilevered mass of outer rotor 114 coupled to and extended from the rotating frame 116, such as shown in FIG. 1. In other embodiments, such as shown in FIG. 2, the rotating frame 116 may define a structural member supporting the outer rotor 114, of which the outer rotor 114 is further coupled to another rotating frame 116.

The second turbine rotor assembly 120 includes an inner rotor 112 including a plurality of inner rotor airfoils 119 extended outward along the radial direction R and in alternating arrangement along the longitudinal direction L with the plurality of outer rotor airfoils 118 of the first turbine rotor assembly 110. In various embodiments, the second turbine rotor assembly 120 is coupled to the second input interface 320 via the second output shaft 122. In one embodiment, the inner rotor 112 of the second turbine rotor assembly 120 is coupled to the gear assembly 300 via the second output shaft 122 (e.g., the inner rotor 112 is coupled to the second output shaft 122).

In various embodiments, the rotating frame 116, the outer rotor 114, and the inner rotor 112 may each define balance planes, cooling passages, and secondary flow passages enabling rotation and support of the first turbine rotor assembly 110 and second turbine rotor assembly 120, respectively. In still various embodiments, the first turbine rotor assembly 110 and the second turbine rotor assembly 120, including, but not limited to, the rotating frame 116, the outer rotor 114, and the inner rotor 112 may each define disks, rotors, or drums, including bladed disks or integrally bladed rotors, dovetails, slots, and airfoils assembled thereto, and a plurality of shrouds and seals.

Although depicted as three stages of inner rotor airfoils 119, it should be appreciated that the power turbine 100 may generally define one or more stages of inner rotor airfoils 119. Still further, the first turbine rotor assembly 110 may define two or more rotating stages, including one or more rotating frame 116 and one or more stages of the outer rotor airfoils 118.

During operation of the engine 10, a flow of fuel is introduced through the combustion section 26 and mixed with air, or oxidizer generally, then burned to produce combustion gases, or hot gases generally. The combustion gases flow through a primary flowpath across the turbine section 31 and the power turbine 100, inducing rotation of the rotary components of turbine section 31 and the power turbine 100, including the first turbine rotor assembly 110 and the second turbine rotor assembly 120. The rotational movement of the turbine section 31 enables further operation of the compressor section 21 to provide compressed air to the combustion section 26 to further mix with fuel and yield combustion gases of increasing energy.

Referring still to FIGS. 1-2, the gear assembly 300 is coupled to the first turbine rotor assembly 110 and the second turbine rotor assembly 120. The gear assembly 300 is disposed within the power turbine 100, or upstream or downstream thereof. In various embodiments, the gear assembly 300 is coupled to the turbine frame 250, or more specifically, a static support structure 255 of the turbine frame 250, in which the turbine frame 250 is disposed downstream of the power turbine 100 (see FIG. 1) or upstream of the power turbine 100 (see FIG. 2). The turbine frame 250 and the static support structure 255 are defined generally concentric to the axial centerline 12. In various embodiments, the gear assembly 300 generally defines a compound gear assembly.

The gear assembly 300 includes a first input interface 310 coupled to the first turbine rotor assembly 110, a second input interface 320 coupled to the second turbine rotor assembly 120, and one or more third gears 330 coupled to the first input interface 310 and the second input interface 320 therebetween. The first input interface 310 and the second input interface 320 may each define a gear or gear mesh, such as a plurality of teeth, between each input interface 310, 320 and their respective turbine rotor assemblies 110, 120. Furthermore, each turbine rotor assembly 110, 120 may define a gear mesh at the interface between the turbine rotor assembly 110, 120 and the respective input interface 310, 320 of the gear assembly 300. In various embodiments, the second input interface 320 defines a sun gear coupled to the second output shaft 122 and driven from the one or more third gears 330 defining one or more planet gears.

Referring still to FIGS. 1-2, the engine 10 further includes a first output shaft 121 and a second output shaft 122. Each of the first output shaft 121 and the second output shaft 122 are configured to couple to an electrical load device. For example, the electrical load device is a generator or other electricity generation and/or distribution assembly. In various embodiments, the first output shaft 121 is generally concentric with the second output shaft 122. For example, the second output shaft 122 is disposed generally inward of the first output shaft 121, with each shaft 121, 122 extended generally along the longitudinal direction L.

During operation of the engine 10, combustion gases induce rotation of the first and second turbine rotor assemblies 110, 120, thereby inducing rotation of the first output shaft 121 and the second output shaft 122. Each shaft 121, 122 is coupled to the electrical load device. For power generating turbine engines, the engine 10 generally operates at a steady state condition generating a steady state power output to the electrical load device. Generally, the first output shaft 121 is configured to rotate at a first steady state speed (e.g., approximately 3000 RPM or 50 Hz) and the second output shaft 122 is configured to rotate at a second steady state speed (e.g., approximately 3600 RPM or 60 Hz). As such, the power turbine 100 enables operation of the gas generator 50 at a single, more efficient, steady state condition while producing a dual output frequency via the first output shaft 121 and the second output shaft 122. The engine 10 enables steady state operation of the engine 10 at a single design point (e.g., a maximum efficiency condition) while enabling the alternative selection of the first steady state speed from the first output shaft 121 (e.g., approximately 50 Hz output) or the second steady state speed from the second output shaft 122 (e.g., approximately 60 Hz output).

Referring now to the embodiment generally provided in FIG. 1, the gear assembly 300 further includes an output interface 340 to which the first output shaft 121 is coupled from the engine 10 to the electrical load device. The output interface 340 generally defines a gear or gear mesh, such as a plurality of teeth, coupled to an interfacing gear mesh or plurality of teeth defined on the first output shaft 121.

In various embodiments, the one or more third gears 330 defined among the first input interface 310 and the second input interface 320 together defines a planetary gear set. The third gear 330 extends along the longitudinal direction L to couple with the first and second input interfaces 310, 320 together as well as the output interface 340. Motive force is provided from each of the first turbine rotor assembly 110 and the second turbine rotor assembly 120 through their respective first input interface 310 and second input interface 320 to the third gear 330. The third gear 330 is coupled to the output interface 340, which is coupled to the first output shaft 121.

In still various embodiments, the static support structure 255 generally defines one or more surfaces against which the gear assembly 300 applies a force to enable rotation of the third gear 330 around the axial centerline 12 of the engine 10. In one embodiment, the static support structure 255 may define a plurality of teeth or gear meshes on which the third gear 330 rides or moves around the axial centerline 12. In such an embodiment, the gear assembly 300 may define a planetary gear set in which the third gear 330 defines a planet gear or a compound planet gear rotating around the axial centerline 12 and transmitting mechanical energy to the output interface 340. The third gear 330 may further rotate about its own central axis, in which the central axis rotates around the axial centerline 12.

In various embodiments, the gear assembly 300 defines a gear ratio of 5:6 of the first input interface 310 coupled to the first turbine rotor assembly 110 relative to the second input interface 320 coupled to the second turbine rotor assembly 120. In the embodiment generally provided in FIGS. 1-2, the first output shaft 121 rotates at approximately the same speed as the first turbine rotor assembly 110 (e.g., a steady state condition of approximately 3000 RPM). Furthermore, the second output shaft 122 rotates at approximately the same speed as the second output shaft 122 (e.g., a steady state condition of approximately 3600 RPM). In still various embodiments, the first turbine rotor assembly 110 is configured to rotate in a first circumferential direction and the second turbine rotor assembly 120 is configured to rotate in a second circumferential direction opposite of the first circumferential direction.

Referring now to the embodiment generally provided in FIG. 2, the engine 10 further includes an output shaft assembly 360. The output shaft assembly 360 includes a locking mechanism 365 configured to alternatively couple the first output shaft 121 and the second output shaft 122. In various embodiments, the locking mechanism defines a clutch configured to engage and disengage the first output shaft 121 and the second output shaft 122 based on the desired output frequency to the electrical load device (e.g., approximately 50 Hz or approximately 60 Hz). In other embodiments, the locking mechanism defines an actuating or retracting pin and slot assembly that engages each of the first turbine rotor assembly 110 and the second turbine rotor assembly 120.

Referring still to the embodiment shown in FIG. 2, the one or more rotating frames 116 of the first turbine rotor assembly 110 is further coupled to the first output shaft 121. The first output shaft 121 extends from the rotating frame 116 of the first turbine rotor assembly 110 to the output shaft assembly 360.

Referring to FIGS. 1-2, the engine 10 further includes one or more bearing assemblies 200 disposed between one or more of the first output shaft 121 and a turbine frame 250. One or more bearing assemblies 200 are further disposed between the first turbine rotor assembly 110 and the second turbine rotor assembly 120. In various embodiments, one or more bearing assemblies 200 are disposed between the turbine frame 250 and one or more of the first turbine rotor assembly 110 and the second turbine rotor assembly 120.

Referring now to FIG. 3, in conjunction with various embodiments described in regard to FIGS. 1-2, the gear assembly 300 further comprises a carrier 305. In the embodiment generally provided, the third gear 330 defines a planet gear coupled to first turbine rotor assembly 110 at the first input interface 310. The second turbine rotor assembly 120 is further coupled to the third gear 330 at the second input interface 320. The carrier 305 is coupled to the third gear 330, such as along a spool extended along the longitudinal direction L.

In the embodiment generally provided in FIG. 3, the first output shaft 121 is coupled to the carrier 305 and the second output shaft 122 is coupled to an output interface 340 at the third gear 330. In one embodiment, the output interface 340 defines a gear or gear mesh, or plurality of teeth, to which the second output shaft 122 mates. In various embodiments, the gear assembly 300 defines a gear ratio of 5:6 of the carrier 305 coupled to the first shaft 121 versus the output interface 340 coupled to the second output shaft 122.

The gear assembly 300 may define a compound planet gear defined by a plurality of the third gear 330 coupled to one another along a single axis such that the plurality of the third gear 330 rotate together. The third gear 330 may rotate about its own central axis, in which the central axis rotates around the axial centerline 12. In one embodiment, the first turbine rotor assembly 110 and the second turbine rotor assembly 120 are together configured to rotate at a speed great than approximately 3600 RPM. For example, the gear assembly 300 including the carrier 305 enables a speed reduction from the first turbine rotor assembly 110 and the second turbine rotor assembly 120. The carrier 305 then outputs to the first output shaft 121 a first speed (e.g., approximately 3000 RPM) and the output interface 340 outputs to the second output shaft 122 a second speed (e.g., approximately 3600 RPM).

Embodiments of the turbine engine 10 including the counter-rotating power turbine 100 with gear assembly 300 provided herein may output two frequencies to an electrical load device while maintaining or improving efficiency and performance at both frequencies. The embodiments of the turbine engine 10 provided herein may improve efficiency and performance of power generating turbine engines while enabling dual frequency output (e.g., 50 Hz and 60 Hz) from a single power turbine 100 and gear assembly 300 mated to the gas generator 50. The embodiments provided herein enable design and operation of the turbine engine at a desired design point, thus maximizing efficiency and performance, while further outputting dual frequencies from the power turbine. As such, the turbine engine enables efficient operation at both frequencies while avoiding off-design point operation that reduces efficiency and performance. Furthermore, the interdigitated power turbine reduces airfoil count, weight, and length, overall improving performance of the turbine engine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A turbine engine defining a longitudinal direction, a radial direction, and a circumferential direction, and defining a forward side and an aft side along the longitudinal direction, the turbine engine comprising:

a power turbine comprising a first turbine rotor assembly interdigitated with a second turbine rotor assembly along the longitudinal direction;

a gear assembly coupled to the first turbine rotor assembly and the second turbine rotor assembly, wherein the gear assembly comprises a first input interface coupled to the first turbine rotor assembly, a second input interface coupled to the second turbine rotor assembly, and one or more gears coupled to the first input interface and the second input interface therebetween; and a first output shaft and a second output shaft, wherein each of the first output shaft and the second output shaft are configured to couple to an electrical load device, wherein the second turbine rotor assembly is coupled to the second input interface via the second output shaft;

wherein at least a part of the first output shaft and at least a part the second output shaft are disposed on the aft side of the gear assembly, and wherein the first output shaft is configured to rotate at a first speed and the second output shaft is configured to rotate at a second speed, different from the first speed.

2. The turbine engine of claim 1, wherein the gear assembly further comprises an output interface, and wherein the first output shaft is coupled to the output interface of the gear assembly.

3. The turbine engine of claim 1, further comprising:
a turbine frame defining a static support structure onto which the gear assembly is at least partially disposed.

4. The turbine engine of claim 3, wherein the one or more gears is coupled to the static support structure of the turbine frame.

5. The turbine engine of claim 4, wherein the one or more gears is further coupled to an output interface, wherein the one or more gears provides a motive force from the first input interface, wherein the first turbine rotor assembly rotates in the circumferential direction at a rotational speed approximately equal to the first output shaft.

6. The turbine engine of claim 1, wherein the gear assembly defines a gear ratio of 5:6 of the first input interface coupled to the first turbine rotor assembly relative to the second input interface coupled to the second turbine rotor assembly.

7. The turbine engine of claim 6, wherein the first turbine rotor assembly is configured to rotate at a steady state speed of approximately 3000 revolutions per minute and the second turbine rotor assembly is configured to rotate at a steady state speed of approximately 3600 revolutions per minute.

8. The turbine engine of claim 1, wherein the gear assembly further comprises a carrier.

9. The turbine engine of claim 8, wherein the one or more gears defines a planet gear coupled to first turbine rotor assembly at the first input interface and coupled to the second turbine rotor assembly at the second input interface, and wherein the carrier is coupled to the one or more gears.

10. The turbine engine of claim 9, wherein the first output shaft is coupled to the carrier and the second output shaft is coupled to an output interface at the one or more gears.

11. The turbine engine of claim 10, wherein the gear assembly defines a gear ratio of 5:6 of the carrier coupled to the first output shaft versus the output interface coupled to the second output shaft.

12. The turbine engine of claim 8, wherein the first turbine rotor assembly and the second turbine rotor assembly are configured to rotate at approximately at a speed greater than 3600 RPM.

13. The turbine engine of claim 1, wherein the first turbine rotor assembly is configured to rotate in a first circumferential direction and the second turbine rotor assembly is configured to rotate in a second circumferential direction opposite of the first circumferential direction.

14. The turbine engine of claim 1, further comprising an output shaft assembly, wherein the output shaft assembly comprises a locking mechanism configured to alternatively couple the first output shaft and the second output shaft.

15. The turbine engine of claim 1, wherein the first turbine rotor assembly of the power turbine comprises an outer rotor comprising a plurality of outer rotor airfoils extended inward along the radial direction, and wherein the first turbine rotor assembly further comprises one or more rotating frames coupling the outer rotor to the gear assembly.

16. The turbine engine of claim 15, wherein the second turbine rotor assembly of the power turbine comprises an inner rotor comprising a plurality of inner rotor airfoils extended outward along the radial direction and in alternating arrangement along the longitudinal direction with the plurality of outer rotor airfoils of the first turbine rotor assembly.

17. The turbine engine of claim 15, wherein the one or more rotating frames of the first turbine rotor assembly is further coupled to the first output shaft.

18. The turbine engine of claim 1, further comprising a compressor disposed on the forward side of the first turbine rotor assembly and the second turbine rotor assembly.

19. The turbine engine of claim 1, wherein each of the first output shaft and the second output shaft is configured to couple to an electrical load device on the aft side of the gear assembly.

20. A turbine engine defining a longitudinal direction, a radial direction, and a circumferential direction, and defining a forward side and an aft side along the longitudinal direction, the turbine engine comprising:
a power turbine comprising a first turbine rotor assembly interdigitated with a second turbine rotor assembly along the longitudinal direction;
a compound gear assembly coupled to the first turbine rotor assembly and the second turbine rotor assembly, wherein the gear assembly comprises a first input interface coupled to the first turbine rotor assembly, a second input interface coupled to the second turbine rotor assembly, and a plurality of gears coupled to the first input interface and the second input interface therebetween; and
a first output shaft and a second output shaft,
wherein each of the first output shaft and the second output shaft are configured to couple to an electrical load device,
wherein the second turbine rotor assembly is coupled to the second input interface via the second output shaft, and
wherein at least a part of the first output shaft and at least a part the second output shaft are disposed on the aft side of the compound gear assembly.

21. The turbine engine of claim 20, wherein the compound gear assembly is defined by a plurality of gears coupled to one another along a single axis so as to rotate together.

22. The turbine engine of claim 20, wherein the first output shaft is configured to rotate at a first speed and the second output shaft is configured to rotate at a second speed, different from the first speed.

23. The turbine engine of claim 20, further comprising a compressor disposed on the forward side of the first turbine rotor assembly and the second turbine rotor assembly.

24. The turbine engine of claim 20, wherein each of the first output shaft and the second output shaft is configured to couple to an electrical load device on the aft side of the compound gear assembly together.

* * * * *